United States Patent [19]
Clauss et al.

[11] 3,926,976
[45] Dec. 16, 1975

[54] 3,4-DIHYDRO-1,2,3-OXATHIAZINE-4-ONES AND A PROCESS FOR THEIR PREPARATION

[75] Inventors: Karl Clauss, Eppenhain, Taunus; Harald Jensen; Erich Lück, both of Frankfurt am Main, all of Germany

[73] Assignee: Hoechst Aktiengesellschaft, Frankfurt am Main, Germany

[22] Filed: June 7, 1973

[21] Appl. No.: 367,888

[30] Foreign Application Priority Data
June 10, 1972  Germany............................ 2228423

[52] U.S. Cl........... 260/243 R; 260/543 R; 426/217
[51] Int. Cl.²....................................... C07D 291/06
[58] Field of Search ............................... 260/243 R

[56] References Cited
UNITED STATES PATENTS

| | | | |
|---|---|---|---|
| 3,317,523 | 5/1967 | Wright................................. | 260/243 |
| 3,689,485 | 9/1972 | Clauss et al......................... | 260/243 |
| 3,689,486 | 9/1972 | Clauss et al......................... | 260/243 |
| 3,780,030 | 12/1973 | Morris ................................ | 260/243 |

*Primary Examiner*—John M. Ford
*Attorney, Agent, or Firm*—Curtis, Morris & Safford

[57] ABSTRACT

3,4-Dihydro-1,2,3-oxathiazinones, a class of chemical compounds having a ring system, are obtained by converting the enolether of a β-ketocarboxylic acid amide-N-sulfone to the enol and treating the enol with an aqueous base. The compounds and their salts are artificial sweetening agents. All of the compounds are organic intermediates having a plurality of reactive groups.

5 Claims, No Drawings

3,4-DIHYDRO-1,2,3-OXATHIAZINE-4-ONES AND A PROCESS FOR THEIR PREPARATION

The present invention relates to certain 3,4-dihydro-1,2,3-oxathiazinones and to methods for making the same.

U.S. Pat. No. 3,689,486 describes new compounds which are derivatives of the ring system of 3,4-dihydro-1,2,3-oxathiazine- 4-one. The compounds, the acid form of which has the general formula Ia

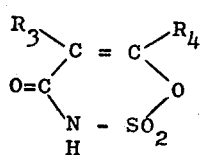

are prepared by cyclization of β-ketocarboxylic acid amide-N- sulfofluorides having the general formula

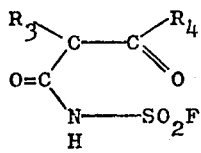

wherein $R_3$ represents hydrogen, an optionally branched alkyl group having from 1–10 carbon atoms, an aromatic hydrocarbon radical having up to 10 carbon atoms or an aliphatic acyl radical having from 2 up to 4 carbon atoms,
wherein $R_4$ stands for an optionally branched alkyl group having up to 11 carbon atoms or an aromatic hydrocarbon radical having up to 10 carbon atoms
and wherein $R_3$ and $R_4$ may also be cross-linked to form an isocyclic ring which optionally may be substituted by further hydrocarbon radicals, in the presence of water with bases.

This process does not permit the preparation of oxathiazinone derivatives with $R_4$ = hydrogen, since corresponding derivatives of formyl acetic acid are not known. Furthermore, it is not possible to thus obtain products wherein $R_3$ and $R_4$ are parts of a benzene ring.

Now it has been found that it is also possible to obtain the compounds of U.S. Pat. No. 3,689,486 as well as new compounds having in common the formula I

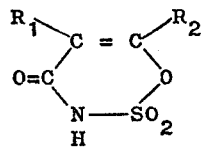

wherein $R_1$ represents the description given for $R_3$ of formula Ia except for that of the acyl radical and wherein $R_2$ conforms to the description given for $R_4$ of formula Ia and wherein, moreover, $R_2$ may be especially hydrogen and wherein $R_1$ and $R_2$, together with the olefinic cross link, may furthermore form a benzene ring, which may be substituted by alkyl and/or alkoxy radicals having from 1—4 carbon atoms and/or halogen atoms, preferably, however, by one single substituent, if in compounds of the general formula II

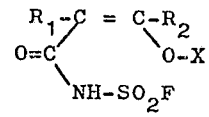

$R_1$ and $R_2$ represent the afore given descriptions and X stands for benzyl, tert.-butyl or triphenylmethyl, and wherein radical X is replaced by H and then, or preferably simultaneously, the oxathiazinone ring is closed by the action of an aqueous solution of a base according to the process described in U.S. Pat. No. 3,689,486, having preferably a pH of from 8–12. The compounds are then isolated.

Further object of the invention are compounds of the general formula I, wherein $R^2$ represents hydrogen or wherein $R_1$ and $R_2$ are cross-linked together to a benzene ring, being substituted optionally by alkyl or alkoxy radicals having from 1–4 carbon atoms, preferably by methyl or methoxy, and/or by halogen atoms.

The basic materials of the general formula II may, for example, be prepared

A. by adding an enolether of the general formula III to fluorosulfonyl-isocyanate

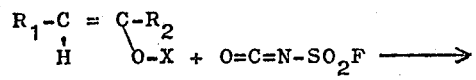

III

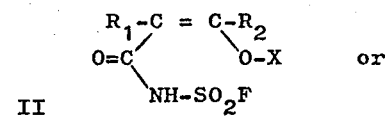

II or

B. by reacting carboxylic acids of the general formula IV with fluorosulfonyl-isocyanate:

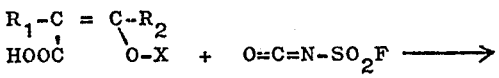

IV

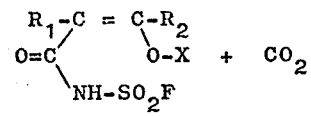

II

Radical X may be replaced by hydrogen in known manner, in case of the preferably used benzyl ethers, by catalytic hydrogenation, whereby special use is made of palladium, particularly on supporting material such as carbon, $BaSO_4$ etc., as a catalyst. The benzyl radical is eliminated as toluene:

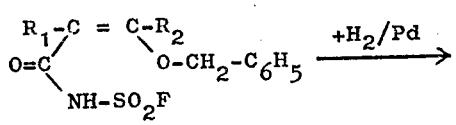

II

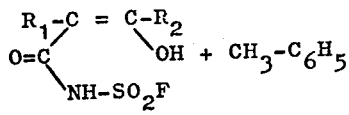

V

As solvents are preferably considered those usually used for catalytic hydrogenation, such as water, lower aliphatic alcohols or acetic acid.

Most suitable temperatures are preferably approximately room temperature, particularly from 0° to 40°C.

For X = tert.butyl- or triphenyl-methyl the hydrogen is introduced in equally known manner by acid hydrolysis, whereby preferably $R_2$ is not hydrogen.

Since the subsequent cyclization requires a previous treatment of the compounds "V" with aqueous bases, it proved advantageous, in case X is benzyl, to carry out the catalytic hydrogenation already in aqueous alkali hydroxide and thus, in one step, to obtain the oxathiazinone derivative (as a salt). This kind of process is especially advantageous for products of the general fromula II with $R_2$ = H, since these may then react via a stabilized enolate, while the free OH—compounds and the corresponding aldehyde-carboxylic-acids are less stable.

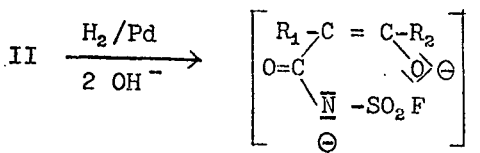

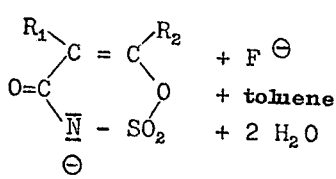

Since the products of the general formula I continue to react in aqueous lye with catalytically activated hydrogen, the take-up of hydrogen has to be stopped after consumption of 1 mole of $H_2$.

As examples for oxathiazinone-dioxides, which can be prepared by the new process, 3,4-dihydro-1,2,3-oxathiazine-4-one-2,2-dioxide; 5-methyl-, 5ethyl-,5-n-propyl-,5-iso-propyl-, 5-n-butyl-, 5-phenyl-, 6-methyl-, and 6-ethyl-3,4-dihydro-1,2,3- oxathiazine-4-one-2, 2-dioxide; and 5,6-benzo-3,4-dihydro-1,2,3-oxathiazinone2,2-dioxide can especially be named.

The products of the general formula I are interesting intermediate products for pharmaceutical and crop protection fields.

Compounds of the formula I, wherein $R_2$ is identical to hydrogen and $R_1$ represents a lower molecular radical containing an alkyl group, or wherein the radicals $R_1$ and $R_2$ do not contain jointly more than 6 carbon atoms, have a very sweet to intensely sweet taste and thus may be used as sweeteners for human and/or animal food, either in their original form or as their non-toxic salts, especially their sodium salts, potassium salts and calcium salts.

EXAMPLES

Example 1a 5,6-benzo-3,4-dihydro-1,2,3-oxathiazine-4-one-2,2-dioxide

To 114 g (0.5 mole) of pulverized salicylic acid-benzyl ether of the melting point 76°–77°C are added dropwise 45 ml of fluorosulfonyl-isocyanate (0.55 mole) at room temperature, whereby increasing the temperature up to about 80°C causes elimination of a gas ($CO_2$). In order to avoid overheating, 100 ml of $CCl_4$ are added in small portions. The mixture is heated at the end of this reaction until complete elimination of the gas (12 l), then a further 50 ml of ethyl acetate are added and crystallization is brought about.

145 Grams of colorless, flaky crystals of a melting point of 115°C (of $CCl_4$) = 94 % theoretical yield are obtained $C_{14}H_{12}FNO_4S$ (309.3) calc: C 54.3 %; H 3.9 %; N 4.5 %; S 10.4 %. found: C 54.5 %; H 3.9 %; N 4.5 %; S 10.1 %.

molecular weight (acidimetric titration): 310

31.0 Grams (0.1 mole) of the thus obtained o-benzyloxy- benzoated amide-N-sulfofluoride are dissolved in 150 ml of acetic acid and stirred vigorously at room temperature in a hydrogen atmosphere after 2 g of a 5 weight % palladium on a carbon support catalyst have been added. The reaction stops after consumption of 2.5 l of hydrogen. Reducing the crystalline acid solution in vacuo yields 21.8 g of colorless crystalline salicylic acid amide-N-sulfofluoride of the melting point of 156°C (decomp.) = 99 % theoretical yield.

$C_7H_6FNO_4S$ (219.2) calc: C 38.4 %; H 2.8 %; F 8.7 %; N 6.4 %. found: C 38.4 %; H 2.8 %; F 8.4 %; N 6.5 %. –

21.9 Grams of salicylic acid amide-N-sulfofluoride (0.1 mole) are stirred into 50 ml of water and 50 ml of 5n-NaOH are added portionwise for cyclization. After 30 minutes, 25 ml of concentrated hydrochloric acid are added under ice-cooling conditions for acidification and 19.0 g of colorless crystals are isolated having a melting point of 170° 14 171°C (95 % of theoretical yield).

The yield of 5,6-benzo-3,4-dihydro-1,2,3-oxathiazine-4-one-2,2-dioxide is 88 %, calculated on the salicylic acid- benzylether.

$C_7H_5NO_4S$ (199.2) calc: C 42.2 %; H 2.5 %; N 7.0 %; S 16.1 %. found: C 42.1 %; H 2.7 %; N 7.1 %; S 15.8 %. molecular weight: 199 (mass spectrum)

IR-spectrum (KBr): 3.0 $\mu$ (NH), 5.95 $\mu$ (C=O), 6.23 $\mu$, 7.5 $\mu$, 8.3 $\mu$, 8.5 $\mu$.

NMR-spectrum (acetone-$d_6$): 7.4 – 8.4 ppm (M, $C_6H_4$) and 11.5 ppm (S, NH).

The sweetening effect is about 100 times stronger than that of cane sugar.

Example 1b:

By hydrogenation of 24.8 g (80 mmole) of o-benzyloxy- benzoic acid-amide-N-sulfofluoride in 200 ml of 1n-NaOH at a temperature of from 25°–30°C with 2 g of 5 weight % palladium on a carbon support catalyst until absorption of 2.0 l of hydrogen (~80 mmole), a clear, colorless solution is obtained. After removal of the catalyst by filtration and upon acidification of this solution by 60 ml of concentrated hydrochloric acid, 14 g (70 mmole) of the colorless crystalline 5,6-benzo-3,4-dihydro- oxathiazinone-dioxide, having a melting point of 170°C, are precipitated (87 % of theoretical yield).

EXAMPLE 2:

3,4-dihydro-1,2,3-oxathiazine-4-one-2,2-dioxide

To a solution of 30 ml (0.375 mole) of fluorosulfonyl- isocyanate in 300 ml of absolute either are added dropwise under ice-cooled conditions 45 ml (0.325 mole) of benzylvinyl- ether. The mixture is then allowed to react overnight at room temperature. After crystallization at −70°C, 70 g (0.27 mole) of a colorless powder are isolated, which melts at a temperature of 126°C (83 % of theoretical yield).

$C_{10}H_{10}FNO_4S$ (259.3) calc: C 46.3 %; H 3.9 %; F 7.3 %; N 5.4 %. found: C 46.6 %; H 4.0 %; F 7.6 %; N 5.4 %.

80 Grams (0.309 mole) of B-benzyloxy-acrylic acid-amide-N-sulfofluoride, having a melting point of 126°C, are stirred vigorously under hydrogen with 750 ml of 1N-NaOH and 5 g of a 5 weight % palladium on a carbon support catalyst at a temperature of from 25° – 30°C until 0.31 mole of hydrogen is absorbed. From the thus obtained alkaline solution of the Na-salt, 24 g (0.161 mole) of colorless crystal needles of dihydro-oxathiazinone-dioxide, having a melting point of 106°C to 107°C, are obtained by acidification with concentrated hydrochloric acid and extraction with ethylacetate.

Yield: 52 % of theoretical yield $C_3H_3NO_4S$ (149.1) calc: C 24.2 %; H 2.0 %; N 9.4 %; S 21.5 %. found: C 24.4 %; H 2.0 %; N 9.5 %; S 21.4 %. molecular weight: 149(mass spectrum)

IR-spectrum ($CH_2Cl_2$): 3.0 $\mu$(NH), 5.75 $\mu$(C=O), 6.1 $\mu$ (C=C), 7.0 $\mu$, 8.3 $\mu$.

NMR-spectrum (DMSO-$d_6$): 6.1 ppm (d, J=6 Hz, =CH), 7.7 ppm (d, J = Hz,=CH) and 13.5 ppm (S, NH).

The sweetening effect is about 10 times stronger than that of cane sugar (compared in a solution at 4 %)

EXAMPLE 3:

5-methyl-3,4-dihydro-1,2,3-oxathiazine-4-one-2,2-dioxide

By means of catalytic isomerization for 20 hours at 40°C of 480 g of benzyl-allylether with 25 g of potassium-tert.- butylate in 200 ml of dry dimethyl-sulfoxide, 405 g of propenyl-benzyl ether having a boiling point of 55°–56°C /3 Torr (yield 84%) are obtained, which is classified by the NMR-spectrum as of ≥95 % belonging to the cis-form variety. NMR spectrum (undiluted): 1.6 ppm (double - doublet, $J_1$=2 Hz, $J_2$ = 7 Hz, $CH_3$), 4.3 ppm (quintet,J = 7 Hz = CH), 4.5 ppm (S, $OCH_2$), 5.8 ppm (double-quartet, O—CH=) and 7.1 ppm (S, $C_6H_5$).

To a solution of 100 ml (1.25 mole) of fluorosulfonyl- isocyanate in 500 ml of absolute ether are added dropwise at 0°–10°C 185 g (1.25 mole) of cis-propenyl-benzylether. After having eliminated the ether by distillation in vacuo, 258 g of an oily residue are obtained, which crystallizes on trituration. Recrystallization from $CCl_4$ results in 200 g (0.73 mole) of colorless crystals having a melting point of 107°to 108°C. Yield: 58 % of α-methyl-β-benzyloxy-acrylic acid amide-N- sulfofluoride.

$C_{11}H_{12}FNO_4S$ (273.3) calc: C 48.3 %; H 4.4%; F 7.0 %; N 5.1 %. found: C 48.6 %; H 4.7 %; F 7.3 %; N 5.2 %.

For elimination of the benzyl group by hydrogenation, 55 g (0.20 mole) of the afore described sulfofluoride, having a melting point of 107°–108°C, are mixed at a temperature of about 30°C by agitation with 500 ml of in NaOH and 5g of a 5 weight % palladium on a carbon support catalyst in a hydrogen atmosphere until absorption of 4.6 l of hydrogen. From the alkaline solution of the sodium salt, 20 g of a soft crystal mass are obtained after acidification with concentrated hydrochloric acid. Recrystallization from n-propylchloride results in 12 g (0.074 mole) of coarse, colorless crystals having a melting point of from 80°–81°C.

The yield in pure 5-methyl-3,4-dihydro-oxathiazinonedioxide is 37 % (theoretical yield).

$C_4H_5NO_4S$ (163.2) calc: C 29.4 %; H 3.1 %; N 8.6 %; S 19.7 %. found: 29.3 %; H 3.2 %; N 8.6 %; S 19.6 %. molecular weight: 163 (mass spectrum)

IR-spectrum ($CH_2Cl_2$): 3.0 $\mu$ (NH, 5.8 $\mu$, 5.9 $\mu$ (C=O), 6.05 $\mu$ (C=C), 8.3 $\mu$.

NMR-spectrum (DMSO-$d_6$): 1.8 ppm (doublet, J = 2 Hz, $CH_3$), 7.6 ppm (quartet, J = 2 Hz, =CH) and 13.9 ppm (S, NH).

EXAMPLE 4:

5-ethyl-3,4-dihydro-1,2,3-oxathiazine-4-one-2,2-dioxide

To a solution of 50 ml of fluoro-sulfonylisocyanate in 300 ml of methylene chloride are slowly added dropwise at a temperature of from 0°–5°C 100 g (0,61 mole) of benzyl-n- butene-1-yl-ether (prepared by catalytic photo-isomerization from benzyl crotyl ether, iron-penta-carbonyl being present). After this mixture has stood for 2 hours at room temperature and after volatiles are eliminated by distillation, 190 g of carbonamide-N-sulfofluoride are obtained in the form of an oil.

For cyclization this oil is agitated at a temperature of from 20° to 30°C, 750 ml of 2N-NaOH and 10 g of a 5 weight % palladium on a carbon support catalyst being present, in a hydrogen atmosphere until absorption of 0.5 mole of hydrogen. After elimination of the catalyst by filtration and after acidification of the alkaline solution by concentrated hydrochloric acid, 51 g of a raw crystal mass are obtained which results after recrystallization with propylchloride in 20 g of coarse, colorless crystals having a melting point of 73°C.

$C_5H_7NO_4S$ (177.2) calc: C 33.9 %; H 4.0 %; N 7.9 %; S 18.1 %. found: C 34.0 %; H 4.0 %; N 8.0 %; S 18.1 %.

molecular weight: 177 (mass spectrum)

IR-spectrum ($CH_2Cl_2$): 3.0 $\mu$ (NH), 5.75 $\mu$, 5.85 $\mu$, 6.05 $\mu$ and 8.3 $\mu$.

NMR-spectrum (DMSO-$d_6$): 1.1 ppm (triplet, J = 7 Hz, $CH_3$), 2.3 ppm (double quartet, $J_1$ = 7 Hz, $J_2$ = 1.2 Hz, $CH_2$), 7.6 ppm (triplet J = 1.2 Hz, =CH) and 13.6 ppm (S, NH).

We claim:

1. The method of making a compound of the formula

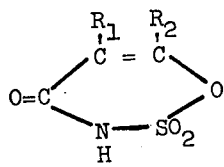

or an alkaline salt thereof, wherein $R_1$, taken alone, is hydrogen, alkyl having 1 to 10 carbon atoms, or aromatic hydrocarbon having up to 10 carbon atoms; $R_2$, taken alone is hydrogen, alkyl having 1 to 11 carbon atoms, or an aromatic hydrocarbon having up to 10 carbon atoms; and $R_1$ and $R_2$, taken together with the carbon atoms to which they are attached, form an isocyclic ring having 5 to 8 carbon atoms, which method comprises catalytically hydrogenating a compound of the formula

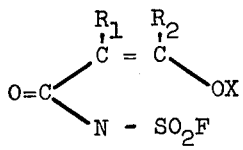

wherein X is benzyl, tert.-butyl, or triphenylmethyl, to replace said X group by hydrogen, simultaneously or subsequently cyclizing the resultant compound to form an oxathiazine ring by treatment thereof with an alkaline solution, and recovering the desired compound.

2. The method as in claim 1 wherein $R_1$ and $R_2$, taken together with the carbon atoms to which they are attached, form an isocyclic ring having at least one substituent thereon selected from the group consisting of lower alkyl, lower alkoxy, and halogen.

3. The method as in claim 1 wherein $R_1$ and $R_2$, taken together with the carbon atoms to which they are attached, form a benzene ring.

4. A compound of the formula

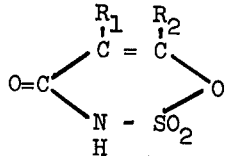

wherein $R_1$ is hydrogen, alkyl having 1 to 10 carbon atoms, or aromatic hydrocarbon having up to 10 carbon atoms, and $R_2$ is hydrogen.

5. A compound as in claim 4 wherein $R_1$ is hydrogen or alkyl having 1 to 4 carbon atoms.

* * * * *